United States Patent [19]

Sakata

[11] 4,098,515

[45] Jul. 4, 1978

[54] ABRASION RESISTING MATERIAL AND USE OF THE SAME

[75] Inventor: Tatsuei Sakata, Nishiyama, Japan

[73] Assignee: Riken Piston Ring Kogyo Kabushiki Kaisha, Tokyo, Japan

[21] Appl. No.: 739,349

[22] Filed: Nov. 5, 1976

[51] Int. Cl.² .................... F16J 15/20; F16C 33/74
[52] U.S. Cl. .................... 277/165; 277/96.2; 277/DIG. 6; 252/12
[58] Field of Search .............. 252/12.2, 12, 12.4, 252/12.6; 277/DIG. 6, 96, 96.2, 138, 223, 224, 228, 165, 235 R, 177

[56] References Cited

U.S. PATENT DOCUMENTS

| 2,879,247 | 3/1959 | Bradford et al. | 252/12 |
| 3,177,998 | 4/1965 | Rossez | 252/12 |
| 3,300,225 | 1/1967 | Shepler | 277/165 |

FOREIGN PATENT DOCUMENTS

| 1,603,013 | 4/1971 | France | 277/DIG. 6 |
| 575,620 | 2/1946 | United Kingdom | 277/DIG. 6 |
| 1,224,735 | 3/1971 | United Kingdom | 252/12 |

Primary Examiner—Robert S. Ward, Jr.
Attorney, Agent, or Firm—Armstrong, Nikaido, Marmelstein & Kubovcik

[57] ABSTRACT

In a sliding mechanism including a first sliding surface, a sliding member having a second sliding surface which contacts with the first sliding surface and slides relatively to the first sliding surface, and a holding member holding the sliding member in contact, while moved, at least a contact portion of the seal member with the holding member is made of polytetrafluoroethylene resin containing iron alloy powder.

6 Claims, 10 Drawing Figures

X100

X400

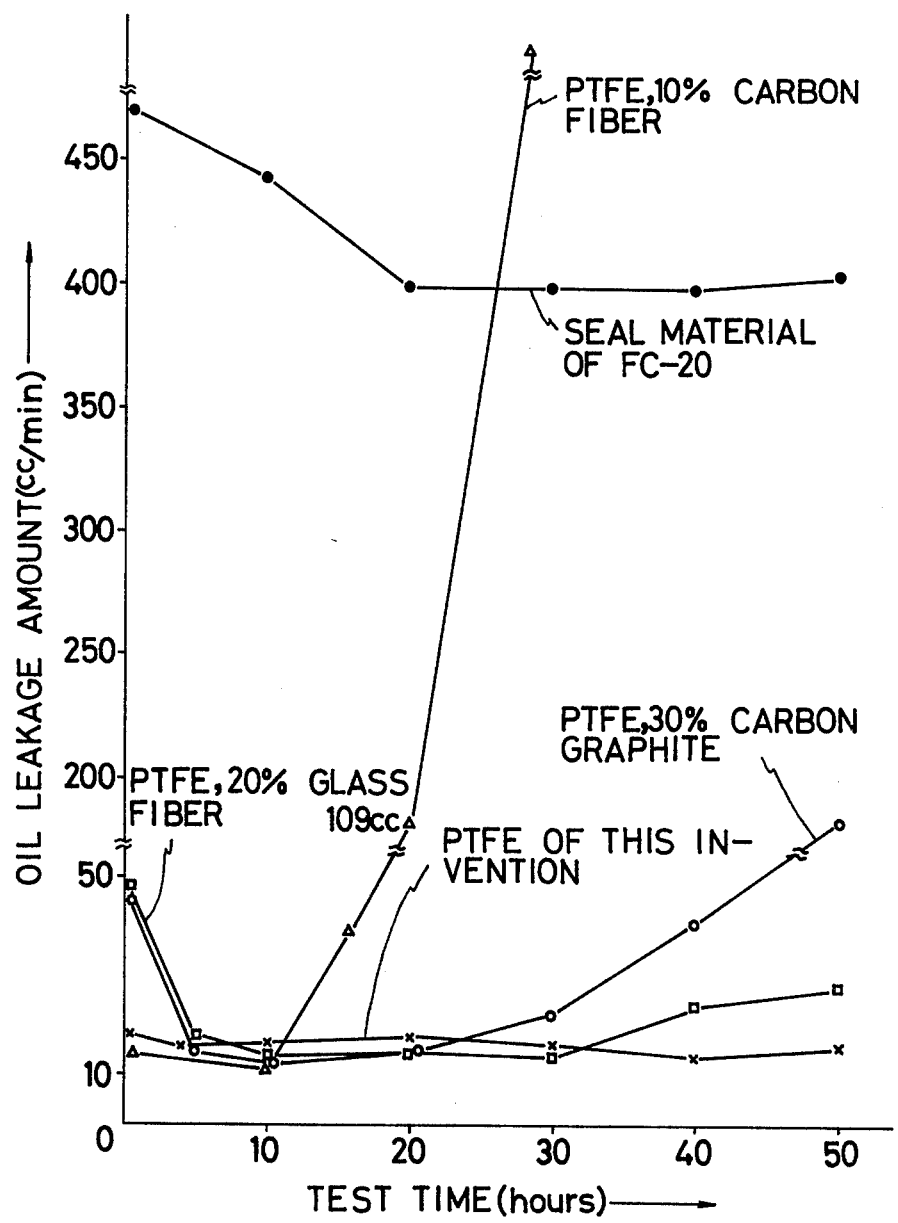

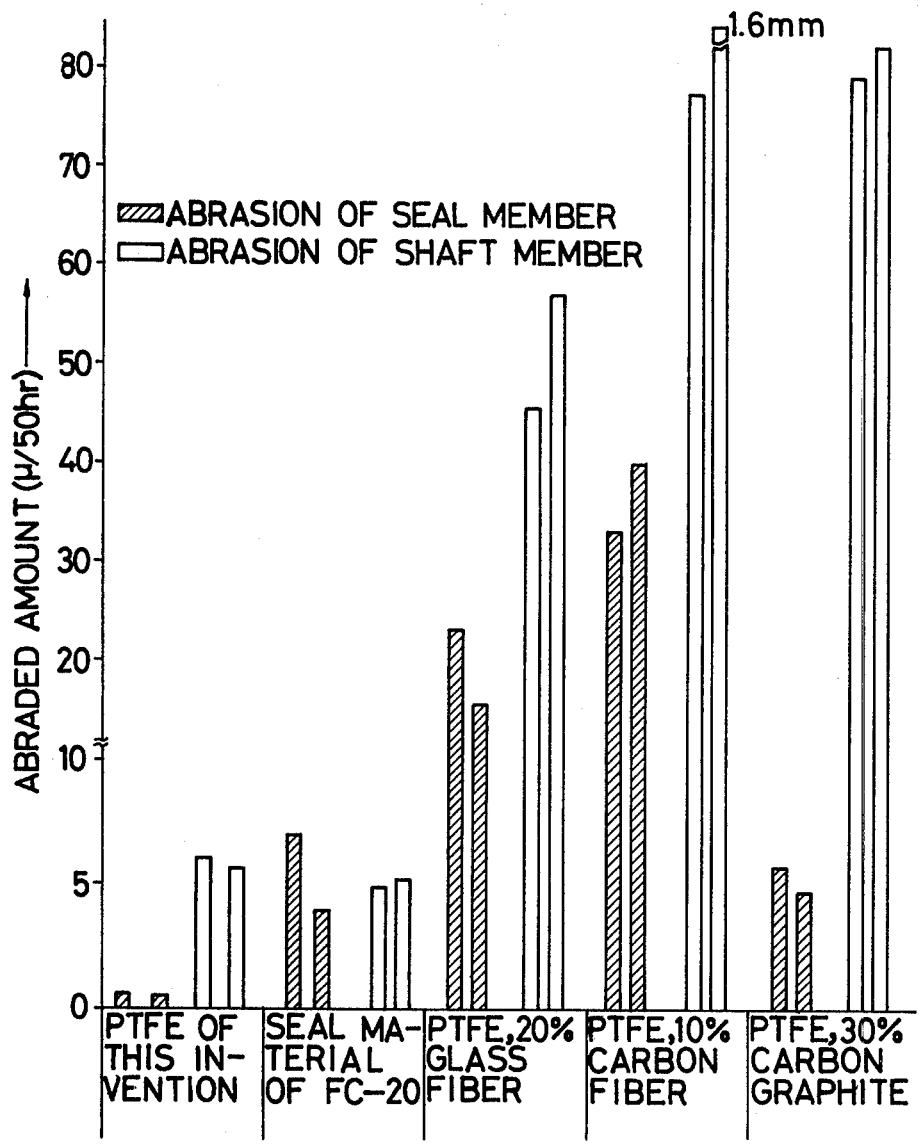

FIG.6 X400
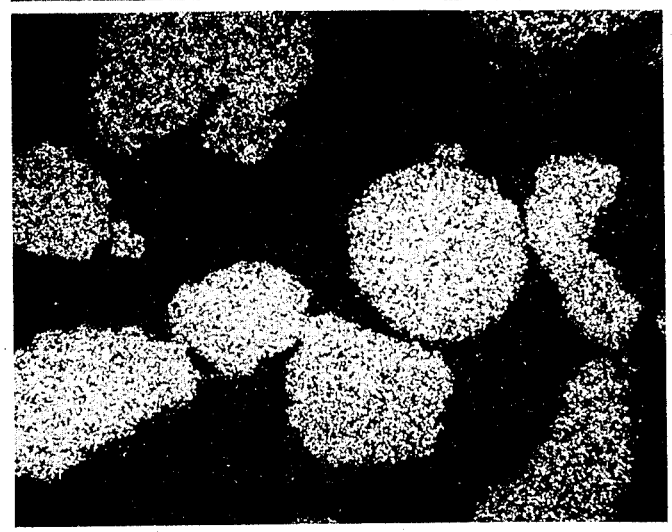
FIG.7 X400
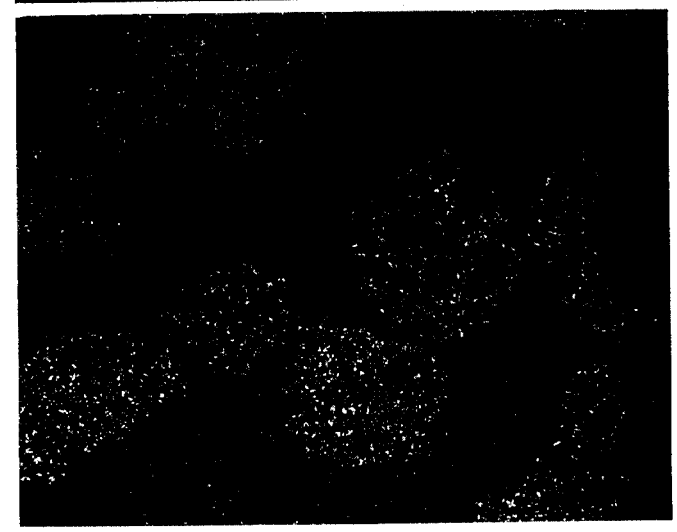
FIG.8 X400

ABRASION RESISTING MATERIAL AND USE OF THE SAME

BACKGROUND OF THE INVENTION

1. Field of the Invention

This invention relates to an abrasion resisting material for a sliding member, and more particularly to an abrasion resisting material for a sliding member, most suitable for an oil seal ring of a torque converter for an automatic transmission, and for a self-lubricating compressor.

2. Description of the Prior Art

Generally, an oil seal ring fitted to a shaft of aluminium alloy is made of cast iron (FC). With respect to the shaft of aluminum alloy, the abrasion resistance or wear resistance of the oil seal ring is satisfactory. However, the fittability and followability of the oil seal ring to the shaft as an associated member are unsatisfactory. That is a problem on an important oil seal ability.

In order to improve the seal ability of the oil seal ring, polytetrafluoroethylene resin (hereafter called "PTFE") containing a certain material is used as a sealing material. For example, there are a PTFE containing 20% by weight (hereafter, "by weight" is omitted) of glass fiber, a PTFE containing 60% of copper alloy (bronze), and a PTFE containing 35% of carbon graphite. Seal rings made of the above described PTFE materials have good fittability and followability to the associated surface and low frictional coefficients. Accordingly, the seal ability can be improved. For example, it is about twenty five times as high as the seal ability of the seal ring of cast iron at the earlier stage of the test time. Such PTFE materials can be applied to different sliding members.

However, the above-mentioned conventional PTFE materials have the disadvantage that they abrade abnormally much an associated material when the associated material is non-ferrous metal, and particularly aluminium or aluminium alloy. For example, when the seal ring of the conventional PTFE material is fitted to the annular groove of the shaft of aluminium alloy, the annular groove of the shaft is remarkably abraded in a driving time of less than 50 hours, and so the seal ability of the seal ring is deteriorated. There occurs some trouble in the oil pressure mechanism. As the result, the seal ring becomes unusable.

Because of such unsatisfactory suitability on abrasion resistance characteristic, the conventional PTFE material is not used as material for a seal ring to be fitted to the annular groove made in the shaft of aluminum alloy, but the seal ring of cast iron is used at present for the above described material, although its seal ability is not satisfactory.

On the other hand, when seal ability is taken seriously, it is desirable to use the seal ring of the PTFE material. However, it is undesirable that the seal ring of the PTFE material is associated with the shaft of aluminium alloy. Accordingly, it is not possible to attempt to lighten a machine by employing the shaft of aluminium alloy. Since the PTFE material is superior in seal ability, it is preferable for sealing material, but there is a problem on the suitability to material to be associated with the PTFE material. No PTFE material to solve the above problem is yet developed. Particularly, there is no material suitable to aluminium alloy or aluminium.

SUMMARY OF THE INVENTION

Accordingly, it is an object of this invention to provide an abrasion resisting material having a good seal ability.

Another object of this invention is to provide an abrasion resisting material which has a high abrasion resistance, and abrades little an associated material sliding relatively to itself, or namely is suitable to the associated material.

A further object of this invention is to provide an abrasion resisting material which is suitable particularly to aluminium or aluminium alloy.

In accordance with an aspect of this invention, an abrasion resisting material is polytetrafluoroethylene resin containing iron alloy powder.

The above and other objects, features and advantages of this invention will become apparent from the following detailed description of illustrative embodiments shown in the accompanying drawings.

BRIEF DESCRIPTION OF THE DRAWINGS

FIG. 4 is a graph showing the relationship between test time and oil leakage amount for different sealing materials.

FIG. 5 is a graph showing the mutual abrasion between seal member and shaft member for different sealing materials of which the seal members are made respectively.

FIG. 6 is an electron-micrograph of 400 magnifications of the surface of a sealing material according to another embodiment of this invention.

FIG. 7 is an X ray (Fe Kα ray) image of 400 magnifications of the surface of the sealing material of FIG. 6;

FIG. 8 is an X ray (S Kα ray) image of 400 magnifications of the surface of the sealing material of FIG. 6;

DESCRIPTION OF THE PREFERRED EMBODIMENTS

One embodiment of this invention will be described with reference to FIG. 1 to FIG. 5.

A sealing material for a sliding member according to this embodiment is polytetrafluoroethylene resin (hereafter, called "PTFE-material") containing cast iron powder. The content of cast iron powder is preferably 30 to 80%, and more preferably 50 to 65%. When it is less than 30%, the abrasion resistance of the sealing material is deteriorated, and an associated material of aluminium alloy is apt to be abraded. And when the content of cast iron powder is more than 80%, the sealing ability of the sealing material is deteriorated, since the content of polytetrafluoroethylene resin is relatively less, and the moldability of the sealing material is deteriorated. Accordingly, the content over 80% is undesirable. The grain size of cast iron powder is preferably 100 to 400 mesh which corresponds to 150 to 40 $\mu$.

In the manufacture of the seal member according to this embodiment, gray cast iron, for example, cast iron for piston ring, which is suitable to aluminium alloy, is pulverized to the above-described grain size, for example, to 150 mesh (100$\mu$). The pulverized cast iron is added into PTEE in a predetermined amount. The mixture is molded into a seal member for a shaft.

Figure 1:
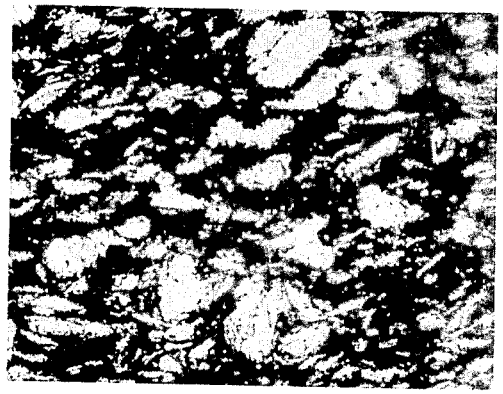
FIG. 1 is a micrograph of 100 magnifications of the surface of a sealing material according to one embodiment of this invention.
Figure 2:
FIG. 2 is a micrograph of 400 magnifications of the surface of the sealing material which is etched with picric acid.

FIG. 1 shows a photomicrograph of the surface of the seal member. In FIG. 1, whitish cast iron particles are dispersed into blackish polytetrafluoroethylene resin as a base material. And carbon particles more black than polytetrafluoroethylene resin exist solely in the base material. The surface of the seal member was etched with picric acid. FIG. 2 shows photomicrograph of 400-magnifications of the surface of the etched seal member. As shown in FIG. 2, pearlite structures, in which whitish ferrite portions and blackish cementite portions are alternately and lamellarly formed in the cast iron particles, are observed, and strips of blackish graphite are separated and extend in the pearlite structures.

When the obtained seal member is slided on the associated (sealed) member in press to the latter, most of the pressing force is received by particles of cast iron powder exposed in the contact surface of the each member. Since the particles of cast iron powder are suitable or congenial to the associated member, the seal member according to this embodiment abrades further less the associated member than a seal member formed of the conventional PTFE material.

In this embodiment, cast iron powder is mixture with polytetrafluoroethylene resin. The cast iron particles dispersed into the resin have graphite flakes in the pearlite bases resistive to abrasion. The graphite flakes impart lubrication to the cast iron particles. Accordingly, the abrasion of the associated member is reduced, and the abrasion resistance of the seal member is improved. Particularly, when the associated member is formed of aluminium alloy, the abrasion resistance of the seal member is well maintained.

Accordingly, there is no possibility that a gap is formed between the seal member and the associated member (shaft) due to the abrasion of the associated member of aluminium alloy. The leakage of oil can be prevented. Moreover, since polytetrafluoroethylene resin is used as the base material of the seal member, the seal ability of the seal member is satisfactory with respect to oil.

Next, there will be described the test results obtained by a testing machine of FIG. 3 by which the seal ability and abrasion resistance of the seal member according to this embodiment were measured.

Figure 3:
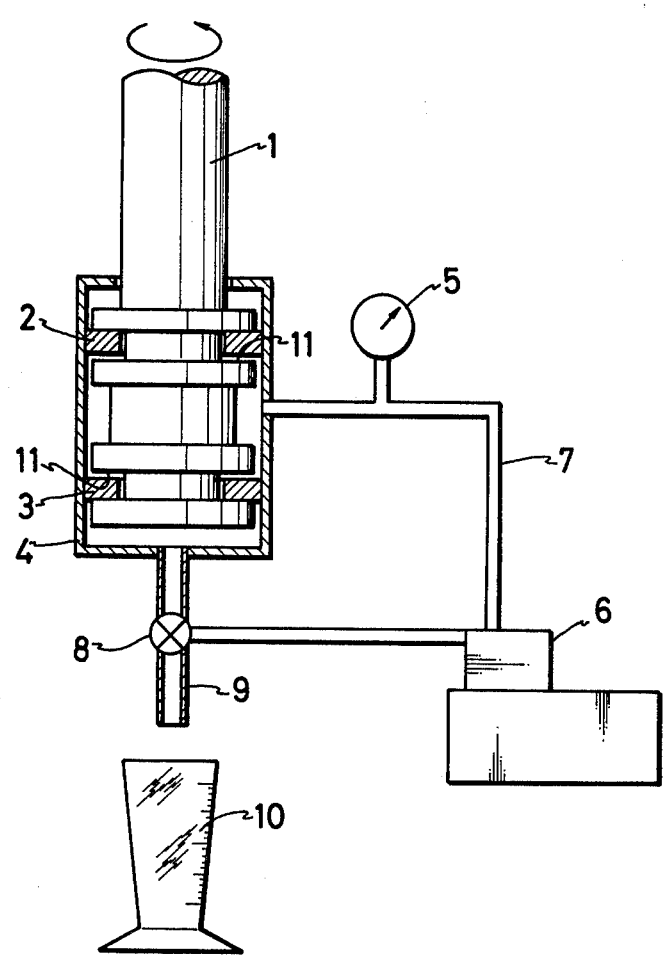
FIG. 3 is an elevational view of a testing machine for testing a sealing material according to this invention, partly broken away.

In the testing machine of FIG. 3, a rotary shaft 1 is made of ADC-No.12 (ASTM B85-69 SC 114A) (aluminium alloy for die casting: 11% Si-3% Cu-1% Fe-residual Al) which is less resistive to abrasion with respect to the conventional PTFE material. Seal members or seal rings 2 and 3 are fitted into annular grooves 11 formed on the circumferential surface of the rotary shaft 1. The seal rings 2 and 3 are formed of the PTFE containing about 60% of cast iron powder in the shape of C-letter. The rotary shaft 1 with the seal rings 2 and 3 is fitted into a casing 4 made of S45C material (structural carbon steel). The seal rings 2 and 3 contact with the inner surface of the casing 4 so as to be slidable. A supply pipe 7 for lubricating oil is connected to the casing 4. An oil pressure gauge 5 and an oil pump 6 are connected to the supply pipe 7. A discharge pipe 9 for leaked oil is connected to the bottom of the casing 4. A valve 8 for measuring leaked oil is connected to the discharge pipe 9. A measuring cylinder 10 is disposed under the discharge pipe 9. A leaked oil is received by the meansuring cylinder 9. Turbine oil No. 140 was used as lubricating oil. The temperature of the oil was 150° C. The rotary shaft 1 was rotated at the rate of 5500 r.p.m. The oil pressure was 8 kg/cm$^2$.

FIG. 4 shows the oil-seal ability of the seal rings 2 and 3 in comparison with the seal rings of the conventional material. It will be understood from FIG. 4 that the seal ring of the PTFE of this invention is very superior to the conventional seal rings of cast iron (FC-20) (ASTM Designation: A-48(64) No. 30) and of PTFE containing any other material. For example, the seal ability of the seal ring of the PTFE containing 20% of glass fiber is nearly equal to that of the seal ring of the PTFE of this invention at the earlier stage of the test time, but the rotary shaft of aluminium alloy is more abraded with time by the seal ring of the PTFE containing 20% of glass fiber, and so its seal ability is more deteriorated. Similarly, both the seal ability of the seal ring of the PTFE containing 10% of carbon fiber and that of the seal ring of the PTFE containing 30% of carbon graphite are comparatively good at the earlier stage of the test time. But, they are much deteriorated with long time.

FIG. 5 shows the mutual abrasion relationships between the seal member and the shaft member (rotary shaft) of aluminium alloy. The results of FIG. 5 show that the abraded amount of the shaft member associated with the seal member of the PTFE of this invention is comparatively small and nearly equal to the abraded amount of the shaft member associated with the seal member of cast iron (FC-20), while the abraded amount of the seal member itself of the PTFE of this invention is further smaller than that of the seal member itself of the cast iron (FC-20). The mutual abrasion between the seal member of the PTFE of this invention and the shaft member is further smaller than the mutual abrasions between the seal members of the other conventional PTFE materials and the shaft member. The correlationship of the abrasion resistance of the PTFE of this invention is superior to that of the abrasion resistance of any of the conventional materials.

As above described, the seal member according to this embodiment comes to fit the rotary shaft of aluminium alloy at the earlier stage of the test time, and it reaches a stable abrasion state after a very short time. Accordingly, it will be understood that the seal member of this embodiment has both a satisfactory oil-seal ability and a good abrasion resistance Moreover, there was little mutual abrasion between the casing and the seal rings (the seal member) of the PTFE of this invention. It will be concluded from that fact that the similar result is obtained when the casing is formed of aluminium alloy. Next, another embodiment of this invention will be described with reference to FIG. 6 to FIG. 10.

Abrasion resisting material or a sealing material according to this embodiment is polytetraflouroethylene resin containing chromium-molybdenum steel powder or containing sulfurized or nitrided chromium-molybdenum steel powder. The content of the steel powder, or that the sulfurized or nitrided steel powder is preferably 45 to 75%, and more preferably 55 to 70%. When it is less than 45%, the abrasion resistance or wear resistance of the PTFE material is deteriorated, and associated material, for example, aluminium alloy is apt to be abraded. And when the content of steel powder, or that of the sulfurized or nitrided steel powder is more than 75%, the sealing ability of the PTFE-material is deteriorated, since the content of polytetrafluoroethylene resin is relatively less, and the moldability of the PTFE-material is deteriorated. Or, the PTFE material becomes fragile. It is not possible to form a seal member out of such PTFE-material. Accordingly, the content over 75% is undesirable. The grain size of the steel powder, or the sulfurized or nitrided steel powder is preferably 150 mesh to 325 mesh.

In the manufacture of the PTFE-material according to this embodiment, structural alloy steel which is suitable to a shaft of aluminium alloy, for example, chromium-molybdenum steel No. 3 (hereafter called "SCM-3" (AISI 4135H), is pulverized to the above-described grain size, for example, to 150 mesh ($100\mu$). The composition of SCM-3 is as follows:

C: 0.33–0.38%
Si: 0.15–0.35%
Mn: 0.60–0.85%
P: < 0.030%
S: < 0.030%
Cr: 0.90–1.20%
Mo: 0.15–0.30%

And a predetermined amount of the pulverized SCM-3 is added into polytetrafluoroethylene resin. The mixture is molded and burned to form a seal member.

Or in the manufacture of the PTFE-material according to this embodiment, the pulverized SCM-3 is maintained at the heating temperature of 450° C in a gas sulfurizing furnace for 5 hours. When the grain size of the SCM-3 powder is less than 150 mesh, the particles of the SCM-powder are thoroughly sulfurized. The sulfurized SCM powder is added into polytetrafluoroethylene resin. In the same manner as above described, a seal member is formed.

In the nitriding, the SCM-3 powder pulverized to less than 150 mesh is maintained at the heating temperature of 500° C for seven to 10 hours in a gas nitriding furnace into which ammonia gas is blown. When the grain size of the SCM-3 powder is less than 150 mesh, nitrogen is thoroughly dispersed into the internals of the particles of the SCM-3 powder. Abrasion resisting powder is obtained. A predetermined amount of the nitrided SCM-3 powder is added into polytetrafluoroethylene resin. In the same manner as above described, a seal member is formed.

FIG. 6 shows an electron-micropraph of the surface of the seal member of this embodiment, which is obtained from a reflected electron image of a scan-type electron microscope. In FIG. 6, the whitish SCM-3 particles pulverized to less than 150 mesh are dispersed in the blackish polytetrafluoroethylene resin. FIG. 7 shows an X ray (Fe K$\alpha$ ray) image of the surface of the seal member of FIG. 6, and FIG. 8 shows an X ray (S K$\alpha$ ray) image of the seal member of the PTFE containing sulfurized SCM-3 powder. It will be understood from the micrographs of FIG. 7 and FIG. 8 that the SCM-3 powder is changed into iron sulfide FeS (filmy) by the gas sulfurizing process.

The seal member of the PTFE containing S CM-3 powder (non-sulfurized and non-nitrided) is improved in creep characteristic. The SCM-3 particles are projected from the surface of the seal member to form a sliding surface. The projected SCM-3 particles slide on the shaft of aluminium alloy. Accordingly, it is avoided that the shaft of aluminium alloy contacts directly with the polytetrafluoroethylene resin base of the seal member which is not suitable to aluminium alloy with respect to abrasion resistance. The abraded amount or wear of the shaft of aluminium alloy is reduced. A satisfactory wear resistance is well maintained. There is little possibility that a gap is formed between the seal member and the shaft of aluminium alloy due to the abrasion of the shaft. The oil leakage is prevented. The seal ability of the seal member is naturally satisfactory, since polytetrafluoroethylene resin is used as base material for the seal member.

The seal member of the PTFE containing the sulfurized SCM-powder (FeS or $Fe_2S$) is similarly improved in creep characteristic. The sulfurized SCM-3 power (FeS or $Fe_2S$) of the seal member functions as a sliding surface, and it exhibits its lubricating ability. As the result, the seal member of the PTFE containing the sulfurized SCM-3 powder exhibits a higher abrasion resistance than the seal member of the PTFE containing non-sulfurized SCM-3 powder. The oil-seal ability is satisfactory.

When the SCM-3 powder pulverized to less than 150 mesh is nitrided, layers of $Fe_3C$-FeN compound are formed on the particles to little depths from the surface of the particles. Diffusion layers of epsilon ($\epsilon$)-FeN are formed in the inwards of the particles. As well known, frictional coefficient of FeN is very low, and FeN is chemically stable to heat. Accordingly, when the polytetrafluoroethylene resin containing nitrided SCM-3 powder is heated in the burning operation after molded, it scarcely changes in hardness. The nitrided SCM-3 powder satisfactorily exhibits its property in the PTFE-material, like the sulfurized SCM-3 powder.

Next, there will be described the test results on the seal members formed of the polytetrafluoroethylene resin containing SCM-3 powder, or sulfurized or nitrided SCM-3 powder. The seal members were tested by the testing machine of FIG. 3.

For test, the seal members (rings) 2 and 3 were formed of polytetrafluoroethylene resin containing about 65% of structural steel alloy powder as the SCM-3 powder.

Figure 9:
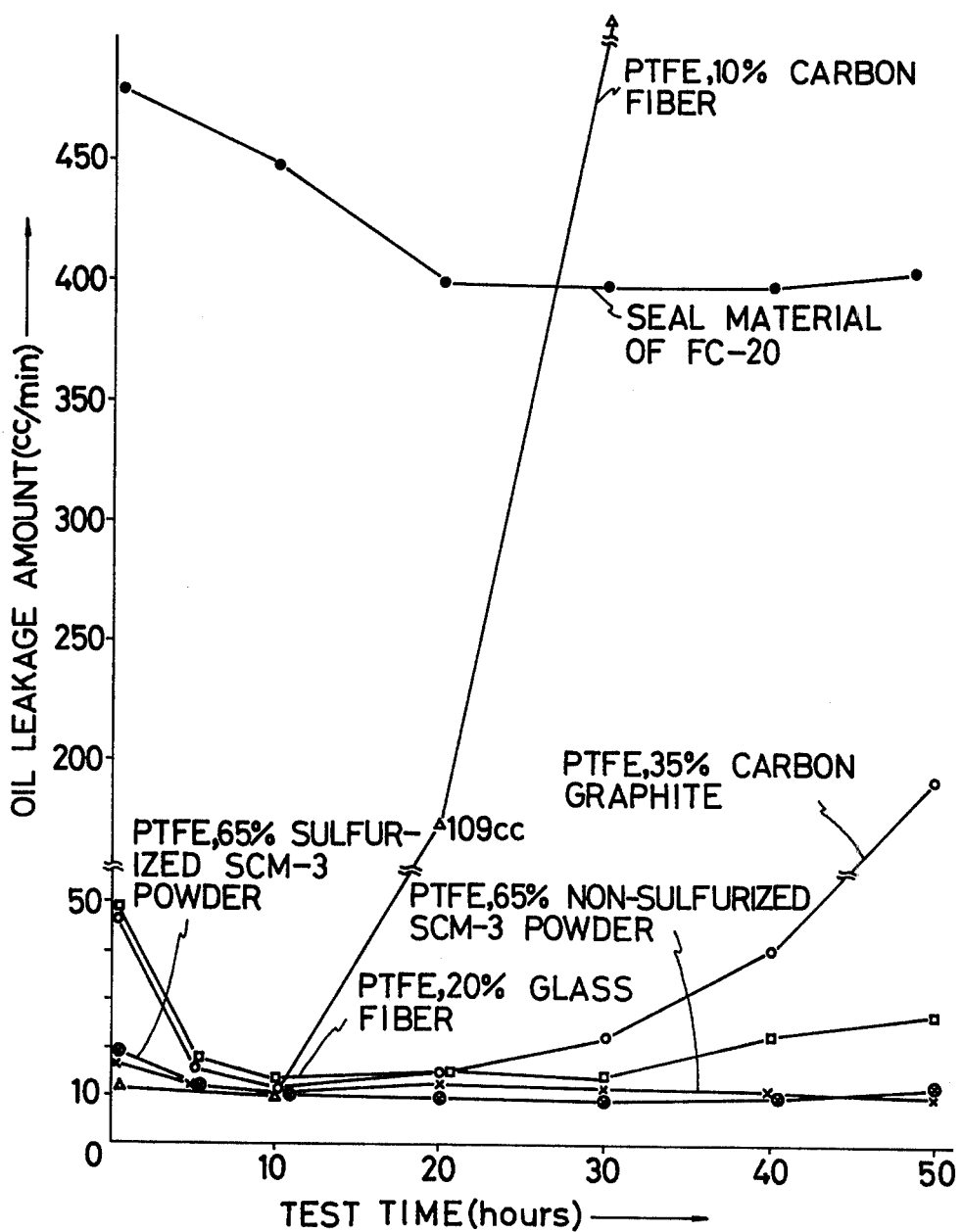
FIG. 9 is another graph showing the relationship between test time and oil leakage amount for different sealing materials.

FIG. 9 shows the oil-seal ability of the seal rings 2 and 3 in comparison with the conventional seal rings. It will be understood from FIG. 9 that the seal rings of the PTFE containing SCM-3 powder (non-sulfurized and non-nitrided), and of the PTFE containing sulfurized SCM-3 powder or nitrided SCM-3 powder are very superior in oil-seal ability to the conventional seal rings of cast iron and of the PTFE containing conventional materials. For example, the oil-seal ability of the seal ring of the PTFE containing 20% of glass fiber is nearly equal to the oil-seal ability of the seal ring of the PTFE according to this invention at the earlier stage of the test time, but the seal ring of the PTFE containing 20% of glass fiber abrades more the shaft of aluminium alloy with further time, and has a tendency to lower its oil-seal in contrast to the seal ring of the PTFE according to this invention. And the oil-seal abilities of the seal rings of the PTFE containing 35% of carbon graphite, and of the PTFE containing 10% of carbon fiber are comparatively good at the earlier stage of the test time, but they are much deteriorated with further time.

Figure 10:
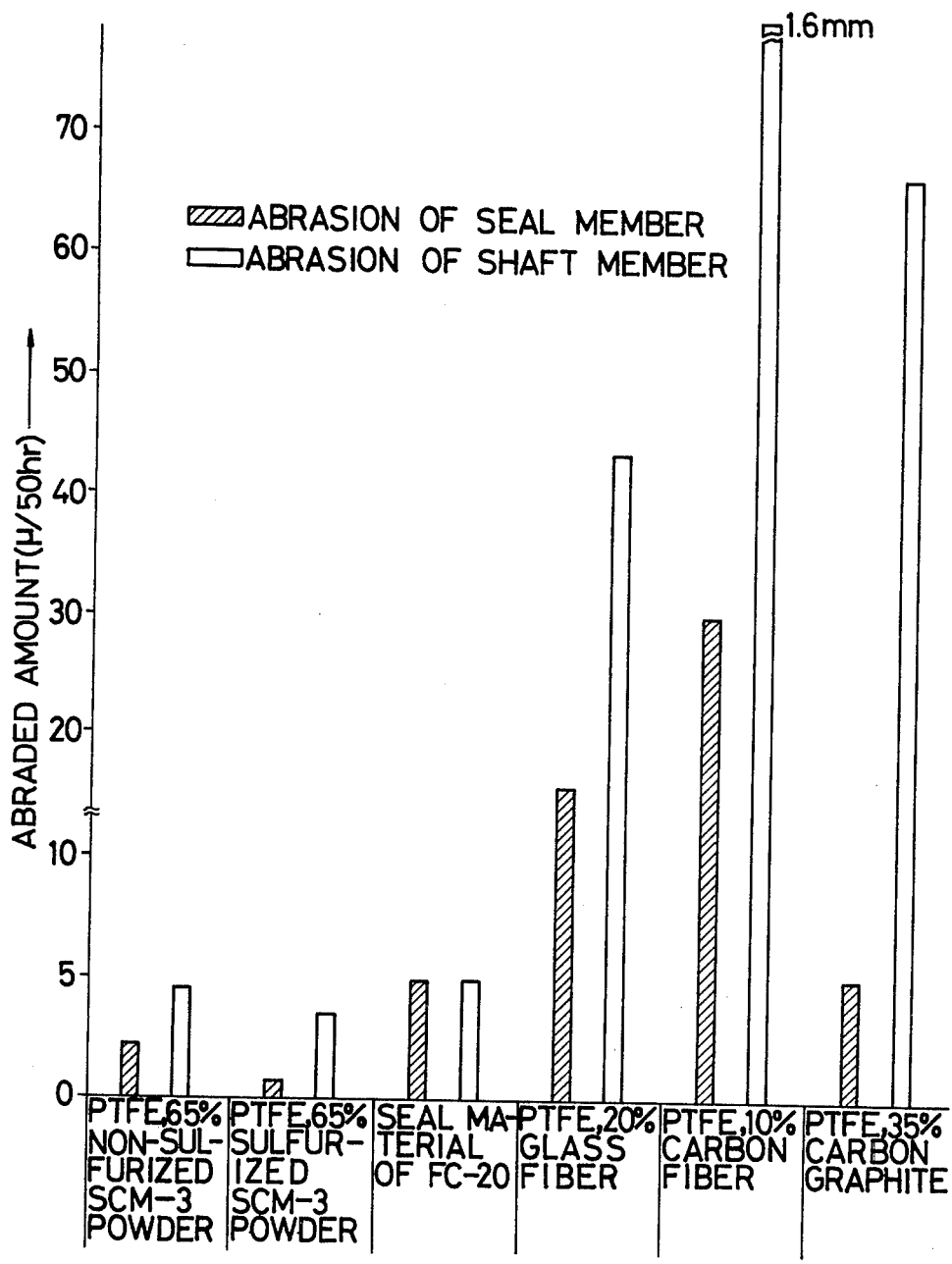
FIG. 10 is another graph showing the mutual abrasion between seal member and shaft member for different sealing materials of which the seal members are made respectively.

FIG. 10 shows the mutual abrasion between the seal ring and the shaft of aluminium alloy. The results of FIG. 10 show that the abrasion of the shaft associated with the seal ring of the PTFE according to this invention is about as little as the abrasion of the shaft associated with the seal ring of cast iron which is suitable to aluminium alloy, and moreover that the abrasion of the seal ring itself of the PTFE according to this invention is much reduced. Particularly, the seal ring of the PTFE containing sulfurized SCM-3 powder, according to this invention, has a remarkable effect in the above mentioned respect. Accordingly, it will be understood that the seal ring of the PTFE according to this invention has better suitability than the seal rings of the conventional materials.

As above described, the seal ring of the PTFE according to this embodiment will fit the shaft of aluminium alloy at the earlier stage of the test time, and reach the stable abrasion state in a very short time. Accordingly, it will be understood that the seal ring of the PTFE according to this embodiment has both satisfactory oil-seal ability and abrasion resistance. Moreover, there was little mutual abrasion between the seal ring of the PTFE according to this embodiment and the casing. The similar result is considered to be obtained when the casing is made of aluminium alloy.

While there have been described the embodiments of this invention, this invention is not limited to those embodiments but various modifications are possible on the basis of the technical concept of this invention.

For example, material to be associated with the material according to this invention is not limited to aluminium alloy. Satisfactory results can be obtained also when it is aluminium, copper alloy or Fe-group material. A little of any other material may be added into the PTFE-material according to the above described embodiments. Only a contact portion of the seal ring with the shaft may be made of the PTFE material according to this invention, and remaining portions of the seal ring may be made of polytetrafluoroethylene resin. The PTFE material according to this invention may contain both surfurized steel powder and nitrided steel powder. Since the PTFE-material according to this invention has a good suitability to aluminium alloy, it may be applied to a sliding member of a self-lubricating compressor.

What is claimed is:

1. A sliding mechanism including a first sliding surface, a sliding member having a second sliding surface which contacts with said first sliding surface and slides relatively to said first sliding surface, and a holding member being made of aluminum alloy or aluminum and holding said sliding member in contact, while moved, in which at least a contact portion of said sliding member with said holding member is made of polytetrafluoroethylene resin containing 50 to 65% by weight of cast iron powder having a grain size of 100 to 400 mesh, or 45 to 75% by weight of chromium-molybdenum steel powder having a grain size of 150 to 325 mesh.

2. A sliding mechanism according to claim 1 in which said cast iron powder or said chromium-molybdenum steel powder is dispersed in said polytetrafluoroethylene resin.

3. A sliding mechanism according to claim 1 in which said chromium-molybdenum steel powder is sulfurized.

4. A sliding mechanism according to claim 1 in which said chromium-molybdenum steel powder is nitrided.

5. A sliding mechanism according to claim 1 in which said sliding member is used as a seal ring.

6. A sliding mechanism according to claim 1 in which a contact portion of said sliding member with said first sliding surface is made of polytetrafluoroethylene resin containing 50 to 65% by weight of cast iron powder having a grain size of 100 to 400 mesh, or 45 to 75% by weight of chromium-molybdenum steel powder having a grain size of 150 to 325 mesh.

* * * * *